US012077021B2

(12) United States Patent
Nishio (10) Patent No.: US 12,077,021 B2
(45) Date of Patent: Sep. 3, 2024

(54) PNEUMATIC TIRE

(71) Applicant: The Yokohama Rubber Co., LTD., Tokyo (JP)

(72) Inventor: Koji Nishio, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 148 days.

(21) Appl. No.: 17/907,353

(22) PCT Filed: Oct. 23, 2020

(86) PCT No.: PCT/JP2020/039889
§ 371 (c)(1),
(2) Date: Sep. 26, 2022

(87) PCT Pub. No.: WO2021/199471
PCT Pub. Date: Oct. 7, 2021

(65) Prior Publication Data
US 2023/0115117 A1 Apr. 13, 2023

(30) Foreign Application Priority Data
Apr. 1, 2020 (JP) ................................. 2020-065955

(51) Int. Cl.
*B60C 9/18* (2006.01)
*B60C 3/04* (2006.01)
*B60C 9/20* (2006.01)

(52) U.S. Cl.
CPC ................. *B60C 9/20* (2013.01); *B60C 3/04* (2013.01); *B60C 2009/2012* (2013.01); *B60C 2009/2035* (2013.01)

(58) Field of Classification Search
CPC ..... B60C 3/00; B60C 3/04; B60C 2009/1842; B60C 2009/1871; B60C 13/00; B60C 13/002
See application file for complete search history.

(56) References Cited

U.S. PATENT DOCUMENTS 9,630,452 B2 * 4/2017 Minowa .................... B60C 9/22

FOREIGN PATENT DOCUMENTS

| JP | 02204104 A | * | 8/1990 |
| JP | 2614461 B2 | | 5/1997 |
| JP | 11-78422 A | | 3/1999 |

(Continued)

*Primary Examiner* — Justin R Fischer
(74) *Attorney, Agent, or Firm* — Thorpe North & Western (57) ABSTRACT

In a pneumatic tire including belt layers in a tread portion, the belt layers include a cross belt pair in which reinforcing cords constituting the belt layers intersect each other between layers, a distance between a tire outer surface and an end point of the cross belt pair measured in parallel to a line segment connecting a ground contact edge and an edge portion on the outer side of the outermost groove in the width direction on an outer surface of the tread portion satisfies 15 mm≤D1≤25 mm, a distance between the belt layer and a carcass layer at a position corresponding to an outer end point in an effective width of the cross belt pair satisfies 2.5 mm≤G1≤9.0 mm, and a ratio between a height Hα from a core separation point to a maximum outer diameter position of the carcass layer and a height Hβ to the maximum width position satisfies 0.55≤Hβ/Hα≤0.65.

18 Claims, 3 Drawing Sheets

(56) References Cited

FOREIGN PATENT DOCUMENTS

| JP | 2007-30582 A | 2/2007 |
| JP | 2008-105515 A | 5/2008 |
| JP | 2012-106572 A | 6/2012 |
| JP | 2012-111269 A | 6/2012 |
| JP | 2012-111835 A | 6/2012 |
| JP | 2016-112980 A | 6/2016 |
| JP | 2017-61233 A | 3/2017 |
| JP | 2019-94025 A | 6/2019 |
| WO | 2009/054408 A1 | 4/2009 |
| WO | 2017/122748 A1 | 7/2017 |

* cited by examiner

PNEUMATIC TIRE

TECHNICAL FIELD

The present technology relates to a pneumatic tire suitable mainly for tires for trucks and buses, and particularly to a pneumatic tire that can provide improved durability of a belt layer.

BACKGROUND ART

A plurality of belt layers is typically embedded in the outer circumferential side of a carcass layer in a tread portion of a pneumatic tire. Such belt layers are formed of various structures depending on a use of a tire, an intended performance, and the like. For example, for pneumatic tires for trucks and buses, the width of the belt layers is typically narrowed with respect to a tread development width (a ground contact width) (see, for example, Japan Patent No. 2614461 B). Adopting such narrow belt layers allows stress concentration at the end portion of the belt layers to be suppressed and belt edge separation to be suppressed, and thus it is advantageous for truck and bus tires which require durability.

Unfortunately, the above-mentioned narrow belt layers are likely to have a large gauge (thickness from a tire inner surface to a tire outer surface) in a buttress portion and are disadvantageous from the viewpoint of heat dissipation. That is, the durability of the belt layers may degrade due to accumulation of heat in the buttress portion. Therefore, measures to ensure good belt durability by improving heat dissipation while suppressing stress concentration without adopting narrow belt layers are awaited.

SUMMARY

The present technology provides a pneumatic tire that can provide improved durability of a belt layer.

A pneumatic tire of the present technology includes a tread portion extending in a tire circumferential direction and having an annular shape, a pair of sidewall portions respectively disposed on both sides of the tread portion, a pair of bead portions each disposed on an inner side of the pair of sidewall portions in a tire radial direction, at least one carcass layer mounted between the pair of bead portions and folded back from a tire inner side toward an outer side around a bead core each provided in the bead portions, a plurality of belt layers disposed on an outer circumferential side of the carcass layer in the tread portion, and a plurality of circumferential grooves extending along the tire circumferential direction on an outer surface of the tread portion. In the pneumatic tire, the plurality of belt layers includes a cross belt pair made of two belt layers configured to reverse inclination directions of reinforcing cords constituting each of the belt layers between the layers to cause the reinforcing cords to intersect with each other, a distance D1 between a tire outer surface and an end point of the cross belt pair on the outer side in the tire radial direction and the outer side in the tire width direction measured in parallel to a line segment L1 connecting a ground contact edge P2 and an edge portion P1 of the outermost groove on the outer side in the tire width direction located on the outermost side in the tire width direction of the plurality of circumferential grooves satisfying a relationship of 15 mm≤D1≤25 mm, a distance G1 between the plurality of belt layers and the carcass layer measured on a normal line of the carcass layer passing through an outer end point in an effective width of the cross belt pair satisfying a relationship of 2.5 mm≤G1≤9.0 mm, and a radial height Hα from a position of a core separation point P3 defined as an intersection point of the carcass layer with an extension line of a side on the outer side of the bead core in the tire radial direction to a maximum outer diameter position of the carcass layer and a radial height Hβ from the position of the core separation point P3 to a tire maximum width position satisfies a relationship of 0.55≤Hβ/Hα≤0.65.

The present technology adopts the above-mentioned structure, allowing the belt durability to be improved by improving the heat dissipation while suppressing the stress concentration. That is, the distance D1 satisfying the above-mentioned relationship causes the end portion of the cross belt pair to be disposed at a position close to the tire outer surface (a surface of a buttress portion), allowing good heat dissipation to be ensured. Further, the distance G1 satisfying the above-mentioned relationship causes the distance between the belt layer and the carcass layer to be appropriately secured, advantageously suppressing stress concentration. Further, the ratio Hβ/Hα satisfying the above-mentioned relationship ensures the good shape of the carcass layer and accordingly ensures the good shape of the entire tire, allowing a gauge (a thickness from a tire inner surface to a tire outer surface) in the buttress portion to be kept low and advantageously suppressing accumulation of heat. The above-mentioned cooperation allows the belt durability to be improved by improving the heat dissipation while suppressing the stress concentration.

In the present technology, a ratio G3/G2 between a distance G2 between an outer surface and an inner surface of the tread portion measured on a tire equator and a distance G3 between the outer surface and the inner surface of the tread portion measured on the normal line of the carcass layer passing through the ground contact edge P2 preferably satisfies a relationship of 1.1≤G3/G2≤1.4. Setting the ratio G3/G2 in this way allows the gauge in the buttress portion to be kept within an appropriate range, advantageously suppressing accumulation of heat and improving belt durability.

In the present technology, a ratio BW/TW between a width BW of a narrower belt layer in the cross belt pair and a ground contact width TW of the tread portion preferably satisfies a relationship of 0.90≤BW/TW≤1.10. Setting the ratio BW/TW in this way allows a belt width to be sufficiently secured, advantageously disposing the end portion of the cross belt pair at a position close to the tire outer surface (the surface of the buttress portion). In the present technology, preferably, a contour line formed by a tire outer surface on the outer side in the tire width direction from the ground contact edge P2 has a curve R1 that includes the ground contact edge P2 and is curved projecting toward the outer side in the tire width direction and a curve R2 connected to the curve R1 and curved projecting toward the inner side in the tire width direction, at least a part of the curve R2 is located on the inner side in the tire width direction from a line L2, which passes through a point P4 located on the outermost side in the tire width direction on the curve R1 and is parallel to the tire radial direction, and forms a recess portion, and the recess portion is disposed in a region A1 defined between the tire maximum width position and an intersection point P5 of the curve R1 with a straight line that passes through a position 0.85 times a groove depth of the outermost groove from a tread surface and is parallel to the line segment L1. Providing the recess portion in this way advantageously suppresses accumulation of heat between the belt layer and the carcass layer and secures good heat dissipation.

At this time, a length D2 of the recess portion along the tire radial direction is preferably from 15 mm to 55 mm. Further, a depth D3 of the recess portion with respect to the line L2 that passes through the point P4 and is parallel to the tire radial direction is preferably 1.5 mm or more. Further, a separation distance D4 along the tire width direction between an outer end point of a wider belt layer in the cross belt pair and the recess portion is preferably 5 mm or more. Specifying the structure of the recess portion in this way makes the structure of the recess portion better, advantageously suppressing accumulation of heat between the belt layer and the carcass layer and securing good heat dissipation.

In the present technology, a narrower belt layer in the cross belt pair is preferably disposed on the outer side in the tire radial direction. The end portion of the narrower belt layer in the cross belt pair typically tends to be a starting point of separation, and disposing the end portion on the tread surface side having a thermal advantage advantageously improves the belt durability.

In the present technology, a separation distance D5 along the tire width direction between an outer end point of a narrower belt layer in the cross belt pair and an outer end point of a wider belt layer in the cross belt pair is preferably 10 mm or more. This advantageously suppresses stress concentration in the cross belt pair.

In the present technology, the plurality of belt layers preferably includes, in addition to the cross belt pair, a large-angle belt layer in which the inclination angle of the reinforcing cord with respect to the tire circumferential direction is larger than that of the cross belt pair. This allows the growth of the outer diameter of the tire to be effectively suppressed, advantageously improving the belt durability.

In an embodiment of the present technology, "ground contact edge" refers to end portions on the outermost side of a ground contact region in a tire width direction. The ground contact region is formed when a regular load is applied to the tire mounted on a regular rim, inflated to a regular internal pressure, and placed vertically on a flat surface. The "ground contact width" is the length of the above-mentioned ground contact region along the tire width direction (distance between the ground contact edges on both sides in the tire width direction). "Regular rim" refers to a rim defined by a standard for each tire according to a system of standards that includes standards with which tires comply, and is "standard rim" defined by Japan Automobile Tyre Manufacturers Association (JATMA), "Design Rim" defined by The Tire and Rim Association, Inc. (TRA), or "Measuring Rim" defined by European Tire and Rim Technical Organization (ETRTO), for example. In the system of standards, including standards with which tires comply, "regular internal pressure" is air pressure defined by each of the standards for each tire and refers to "maximum air pressure" in the case of JATMA, the maximum value being listed in the table "TIRE LOAD LIMITS AT VARIOUS COLD INFLATION PRESSURES" in the case of TRA, or "INFLATION PRESSURE" in the case of ETRTO. However, "regular internal pressure" is 180 kPa in a case where a tire is for a passenger vehicle. "Regular load" is a load defined by a standard for each tire according to a system of standards that includes standards with which tires comply, and refers to a "maximum load capacity" in the case of JATMA, the maximum value being listed in the table of "TIRE LOAD LIMITS AT VARIOUS COLD INFLATION PRESSURES" in the case of TRA, or "LOAD CAPACITY" in the case of ETRTO. "Regular load" corresponds to 88% of the loads described above in a case where a tire is for a passenger vehicle.

DETAILED DESCRIPTION

Configurations of embodiments of the present technology will be described in detail below with reference to the accompanying drawings.

Figure 1:
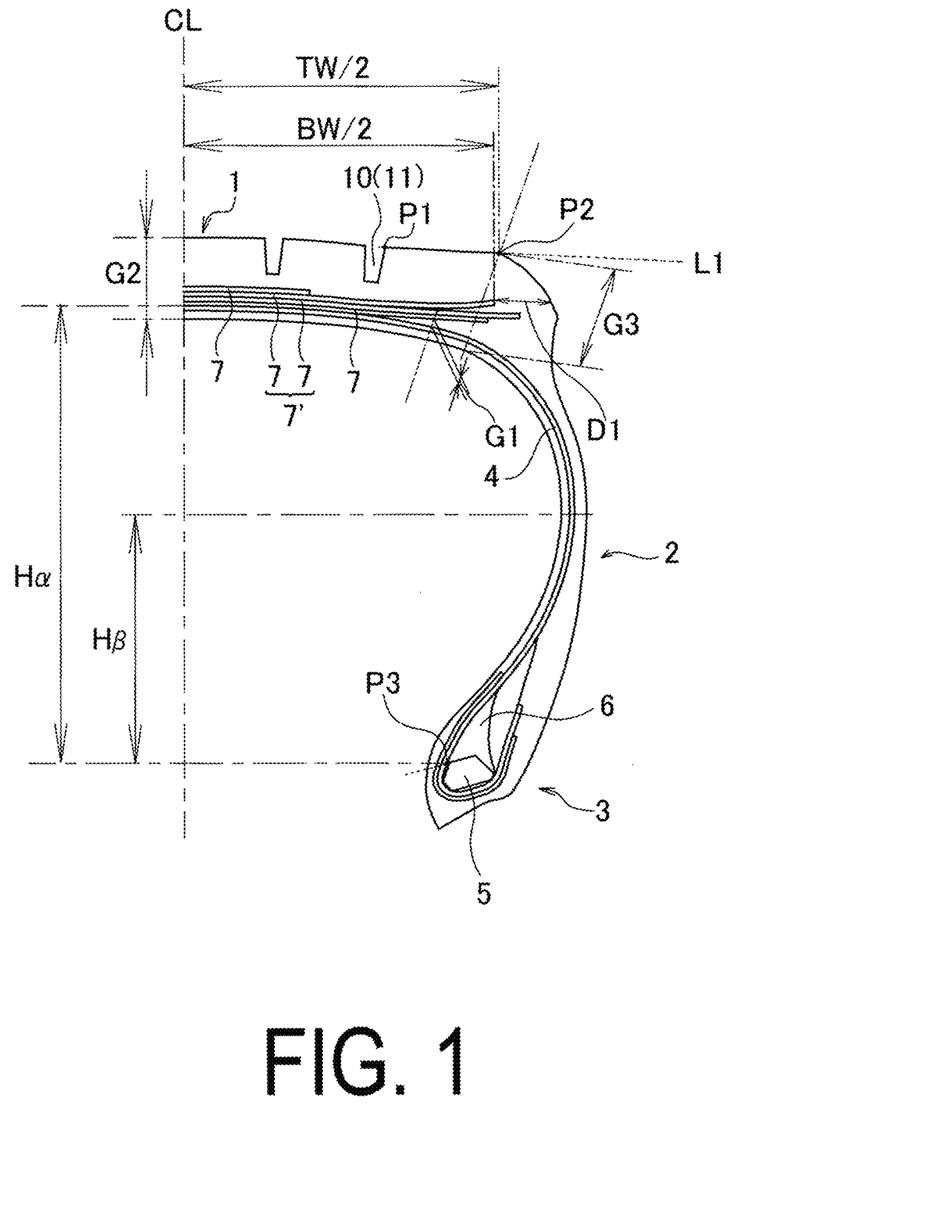
FIG. 1 is a meridian cross-sectional view of a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 on the inner side in the tire radial direction. Note that "CL" in FIG. 1 denotes a tire equator. Note that FIG. 1 is a meridian cross-sectional view, and although not illustrated, the tread portion 1, the sidewall portions 2, and the bead portions 3 each extend in the tire circumferential direction and each have an annular shape, and accordingly, a basic structure of a toroidal shape of the pneumatic tire is formed. Although the description using FIG. 1 is basically based on the illustrated meridian cross-sectional shape, all of the tire components each extend in the tire circumferential direction and form the annular shape.

A carcass layer 4 is mounted between the left-right pair of bead portions 3. The carcass layer 4 includes a plurality of reinforcing cords extending in the tire radial direction and is folded back around a bead core 5 disposed in each of the bead portions 3 from a vehicle inner side to a vehicle outer side. Additionally, a bead filler 6 is disposed on the periphery of the bead core 5, and the bead filler 6 is enveloped by a body portion and a folded back portion of the carcass layer 4. The present technology can be applied to various tires having a basic structure described later and can be preferably used particularly for truck and bus tires. That is, the reinforcing cord constituting the carcass layer 4 is preferably a steel cord. The shape of the carcass layer 4 is not limited and preferably has a shape close to the so-called "equilibrium carcass line". The "equilibrium carcass line" is a shape obtained from the tire equilibrium shape theory and is the natural equilibrium shape of a carcass layer when the tire is filled with regular internal pressure and the tension of the carcass layer receives substantially no force other than the internal pressure and the counter force generated in the region where the carcass layer overlaps a belt layer, the natural equilibrium shape being formed in balance with these forces.

Figure 2:
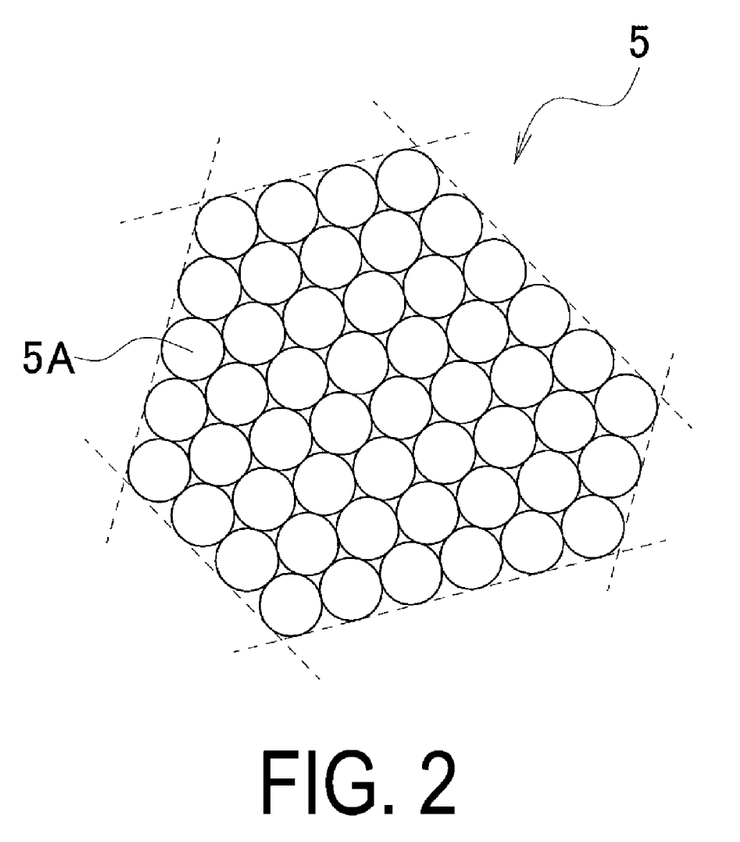
FIG. 2 is an enlarged meridian cross-sectional view illustrating a bead core of a pneumatic tire according to an embodiment of the present technology.

The cross-sectional shape of the bead core 5 is not limited and, as illustrated in FIGS. 1 and 2, is preferably a polygonal shape (for example, a hexagonal shape as illustrated in the drawing) having sides on the outer side in the tire radial direction. More specifically, as illustrated in an enlarged view in FIG. 2, the bead core 5 is preferably made of at least one bead wire 5A wound in the tire circumferential direction and preferably forms a plurality of lay ers in which a plurality of circumferential portions of the bead wire 5A overlaps, in the tire radial direction, at least one row aligned in the tire width direction. Then, in the meridian cross-section, the common tangent lines (broken lines in the drawing) of the plurality of circumferential portions of the bead wire 5A preferably form a polygonal shape (for example, a hexagonal shape as illustrated in the drawing) having sides on the outer side in the tire radial direction. With such a shape, the structure of the bead core 5 may be a so-called single-winding structure in which a single bead wire 5A is continuously wound or may be a so-called layer-winding structure in which a plurality of bead wires 5A is wound in a bunched state.

A plurality of belt layers 7 (four layers in FIG. 1) is embedded on an outer circumferential side of the carcass layer 4 in the tread portion 1. Each belt layer 7 includes a plurality of reinforcing cords (steel cords) oriented in a predetermined direction. A cross belt pair 7' is always included in the plurality of belt layers 7. The cross belt pair 7' is a combination of at least two belt layers configured such that the inclination angle of the reinforcing cords with respect to the tire circumferential direction is set in the range of from 10° to 40°, and the inclination directions of the reinforcing cords are reversed between the layers so that the reinforcing cords intersect with each other.

In addition to the cross belt pair 7', a large-angle belt layer in which the inclination angle of the reinforcing cord with respect to the tire circumferential direction is set in the range of from 40° to 75°, a protective belt layer disposed in the outermost layer and having a width of 85% or less of that of the other belt layers, and a circumferential reinforcing layer in which the angle of the reinforcing cord with respect to the tire circumferential direction is set in the range of 0° to 5° may be optionally provided. For example, in FIG. 1, one protective belt layer is disposed on the outermost layer, one large-angle belt layer is disposed on the innermost layer, and the other two layers are the cross belt pair. In particular, the large-angle belt layer effectively suppresses the growth of the outer diameter, effectively improves the belt durability and is preferably provided as shown in the illustrated example.

In addition, a belt reinforcing layer (not illustrated) can be provided on the outer circumferential side of the belt layers 7. The belt reinforcing layer may be configured of, for example, an organic fiber cord oriented in the tire circumferential direction. In the belt reinforcing layer, the angle of the organic fiber cords with respect to the tire circumferential direction can be set to, for example, from 0° to 5°.

In the present technology, the groove formed on the outer surface of the tread portion 1 and the structure of the land portion (tread pattern) are not limited, but a plurality of circumferential grooves 10 extending along the tire circumferential direction is always formed. In the following description, of these plurality of circumferential grooves 10, the one located on the outermost side in the tire width direction is referred to as the outermost groove 11.

The present technology basically defines the structure of the belt layer 7 (particularly in the vicinity of the end portion of the cross belt pair 7') as described below. The present technology can be applied to a typical pneumatic tire including the above-mentioned constituent members, and its basic structure is not limited to those described above.

As shown in FIG. 1, an edge portion of the outermost groove 11 on the outer side in the tire width direction (the corner portion formed by the groove wall on the outer side in the tire width direction and the ground contact surface) is P1, the ground contact edge is P2, a line segment connecting these is L1, and in the present technology, a distance D1 between a tire outer surface and an end point of the cross belt pair 7' on the outer side in the tire radial direction and the outer side in the tire width direction measured in parallel to the line segment L1 satisfies a relationship of $15\ \text{mm} \leq D1 \leq 25\ \text{mm}$, preferably $17\ \text{mm} \leq D1 \leq 23\ \text{mm}$. Setting the distance D1 in this way causes the end portion of the cross belt pair 7' to be disposed at a position close to the tire outer surface (the surface of the buttress portion), allowing good heat dissipation to be ensured. When the distance D1 is less than 15 mm, the wider belt layer 7 in the cross belt pair 7' may be exposed on the surface of the buttress portion. When the distance D1 exceeds 25 mm, the end portion of the cross belt pair 7' cannot be disposed at a position close to the tire outer surface (the surface of the buttress portion), and it becomes difficult to secure heat dissipation.

As shown in FIG. 1, a normal line (dashed line in the figure) of the carcass layer 4 passing through the outer end point in the effective width of the cross belt pair 7' is drawn, the distance between the belt layer 7 and the carcass layer 4 measured on this normal line (the thickness of the rubber existing between the belt layer 7 on the radially innermost side and the carcass layer 4) is G1, and in the present technology, the distance G1 satisfies a relationship of $2.5\ \text{mm} \leq G1 \leq 9.0\ \text{mm}$, preferably $3.5\ \text{mm} \leq G1 \leq 7.0\ \text{mm}$. Setting the distance G1 in this way allows the distance between the belt layer 7 and the carcass layer 4 to be appropriately secured, advantageously suppressing stress concentration. When the distance G1 is less than 2.5 mm, the distance between the belt layer 7 and the carcass layer 4 cannot be sufficiently secured, and it becomes difficult to suppress stress concentration. When the distance G1 exceeds 9.0 mm, the amount of rubber between the belt layer 7 and the carcass layer 4 increases, accumulation of heat may easily occur.

The "effective width of the cross belt pair 7'" is a range in which the belt layers 7 constituting the cross belt pair 7' moderately come close each other to cause the cross belt pair 7' (the belt layer 7) to effectively function. The "outer end point in the effective width of the cross belt pair 7'" is the point where the interlayer gauge of the belt layer 7 included in the cross belt pair 7' starts to enlarge when the cross belt pair 7' is viewed from the position of the tire equator CL toward the outer side in the tire width direction. Strictly, the interlayer gauge at an arbitrary position of the belt layer 7 included in the cross belt pair 7' is h, the average value of the interlayer gauge of the cross belt pair 7' in the range of 50% of the width of the narrower belt layer 7 in the cross belt pair 7' centered around the tire equator is hcc, and the innermost point in the tire width direction where $h = 1.5 \times hcc$ is the "outer end point in the effective width of the cross belt pair 7'". However, when the interlayer gauge h is $h \leq 1.5 \times hcc$ in the entire width of the cross belt pair 7' (when the interlayer gauge of the cross belt pair 7' is substantially constant), the outer end point of the narrower belt layer 7 in the cross belt pair 7' is regarded as the "outer end point in the effective width of the cross belt pair 7'".

As shown in FIG. 1, the intersection point of the extension line of the side of the bead core 5 on the outer side in the tire radial direction and the carcass layer 4 is a core separation point P3, the distance along the tire radial direction from the position of the core separation point P3 to the maximum outer diameter position of the carcass layer 4 is a radial height H $\alpha$, the distance along the tire radial direction from the position of the core separation point P3 to the tire maximum width position of the tire is a radial height H$\beta$, and in the present technology, the radial height ratio H$\beta$/H$\alpha$ satisfies a relationship of $0.55 \leq H\beta/H\alpha \leq 0.65$, preferably $0.57 \leq H\beta/H\alpha \leq 0.63$. Setting the ratio H$\beta$/H$\alpha$ in this way ensures the good shape of the carcass layer 4 and accordingly ensures the good shape of the entire tire also, allowing the gauge (the thickness from the tire inner surface to the tire outer surface) in the buttress portion to be kept low and advantageously suppressing accumulation of heat. When the ratio Hβ/Hα is less than 0.55, the tire maximum width position tends to move toward the inner side in the tire radial direction, the gauge in the buttress portion tends to become thicker, and thus the effect of suppressing accumulation of heat cannot be sufficiently obtained. When the ratio Hβ/Hα exceeds 0.65, it becomes difficult to set the above-mentioned distance G1 to a moderate size. The range of this ratio Hβ/Hα is also an effective range from the viewpoint of forming the above-mentioned equilibrium carcass line.

As described above, the present technology sets the distance D1, the distance G1, and the ratio Hβ/Hain appropriate ranges, allowing the structure at the end portion of the belt layer 7 or its vicinity to be optimized. That is, the durability of the belt layer 7 can be effectively improved by the cooperation of the distance D1 ensuring the heat dissipation, the distance G1 suppressing the stress concentration, and the ratio Hβ/Hα suppressing accumulation of heat.

As shown in FIG. 1, the distance between the outer surface and the inner surface of the tread portion 1 measured on the tire equator is a distance G2, the distance between the outer surface and the inner surface of the tread portion 1 measured on the normal line of the carcass layer 4 passing through the ground contact edge P2 is a distance G3, and the ratio G3/G2 preferably satisfies a relationship of 1.1≤G3/G2≤1.4, more preferably 1.15≤G3/G2≤1.35. Setting the ratio G3/G2 in this way allows the gauge (total thickness of the tire) in the buttress portion to be kept within a moderate range, advantageously suppressing accumulation of heat and improving belt durability. When the ratio G3/G2 is less than 1.1, it becomes difficult to set the above-mentioned distance G1 to a moderate size. When the ratio G3/G2 exceeds 1.4, the gauge in the buttress portion becomes excessive, resulting in the limited effect of suppressing accumulation of heat.

As shown in FIG. 1, when the width of the narrower belt layer 7 in the cross belt pair 7' is BW and the ground contact width of the tread portion 1 is TW, the ratio BW/TW preferably satisfies a relationship of 0.90≤BW/TW≤1.10, more preferably 0.93≤BW/TW≤1.07. Setting the ratio BW/TW in this way a belt width to be sufficiently ensured, advantageously disposing the end portion of the cross belt pair 7' at a position close to the tire outer surface (the surface of the buttress portion). When the ratio BW/TW deviates from the above-mentioned range, it becomes difficult to set the above-mentioned distance G1 to a moderate size.

Figure 3:
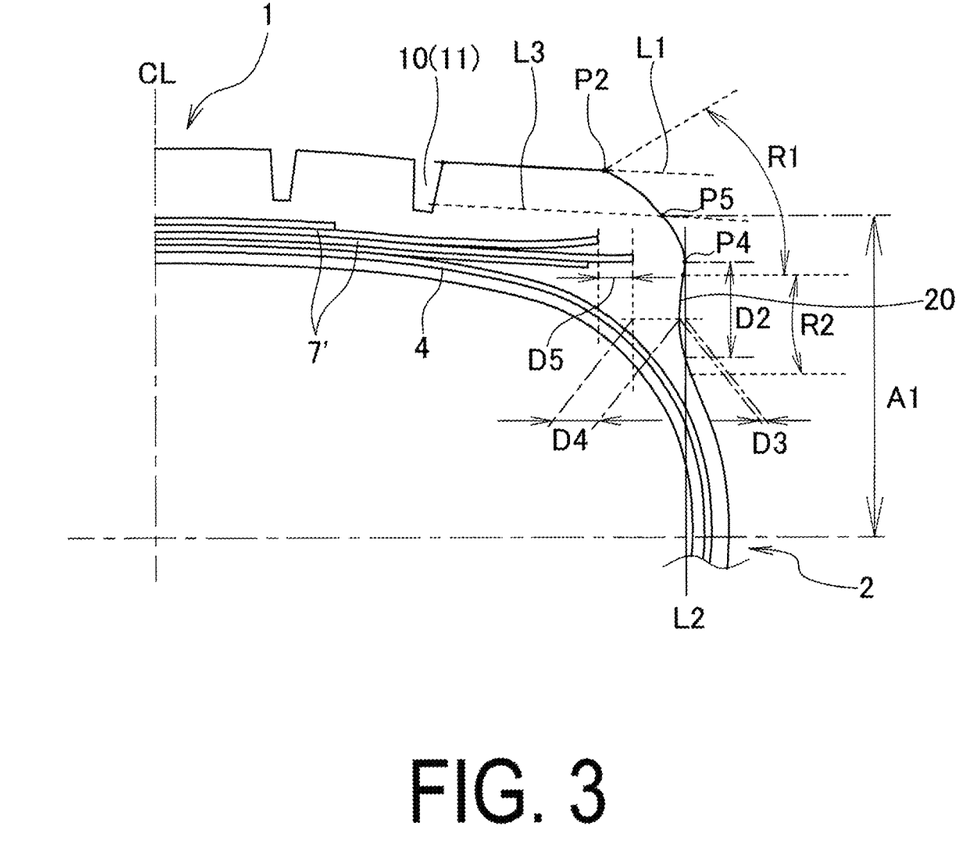
FIG. 3 is an enlarged explanatory diagram illustrating a location near the tread portion of FIG. 1.

As shown in FIG. 3, the contour line formed by the tire outer surface on the outer side in the tire width direction from the ground contact edge P2 may be configured to include a curve R1 curved projecting toward the outer side in the tire width direction while including the ground contact edge P2 and a curve R2 connected to the curve R1 and curved projecting toward the inner side in the tire width direction. The curve R1 and the curve R2 may be configured to connect a plurality of arcs having different radii of curvature to form the above-mentioned curved shape as a whole. At this time, it is preferable to form a recess portion 20 in the buttress portion by disposing at least a part of the curve R2 on the inner side in the tire width direction from the line L2 parallel to the tire radial direction while passing through the point P4 located on the outermost side in the tire width direction on the curve R1. In this case, the recess portion 20 is preferably disposed in a region A1 defined between the tire maximum width position and an intersection point P5 of the curve R1 and a straight line L3 parallel to the line segment L1 while passing through a position 0.85 times the groove depth of the outermost groove 11 from the tread surface. Providing the recess portion 20 in this way advantageously suppresses accumulation of heat between the belt layer 7 and the carcass layer 4 and secures good heat dissipation.

When the recess portion 20 is provided, the length D2 of the recess portion 20 along the tire radial direction is preferably from 15 mm to 55 mm, more preferably from 20 mm to 45 mm. Such a structure advantageously suppresses accumulation of heat between the belt layer 7 and the carcass layer 4 and ensures good heat dissipation. When the length D2 is less than 15 mm, there is no difference from the case where the recess portion 20 is not provided, and the effect of suppressing accumulation of heat and improving heat dissipation cannot be sufficiently obtained. When the length D2 exceeds 55 mm, the deflection due to the recess portion 20 tends to increase to cause the amount of heat build-up itself increase, failing to sufficiently obtain the effect of suppressing accumulation of heat and improving heat dissipation.

When the recess portion 20 is provided, the depth D3 of the recess portion 20 with respect to the line L2 passing through the point P4 and parallel to the tire radial direction (the distance along the tire width direction from the line L2 to the innermost point of the recess portion 20 in the tire width direction) is preferably 1.5 mm or more, more preferably 2.0 mm or more. Further, the separation distance D4 along the tire width direction between the outer end point of the wider belt layer 7 in the cross belt pair 7' and the recess portion 20 (the innermost point of the recess portion 20 in the tire width direction) is preferably 5 mm or more, more preferably 8 mm or more.

Specifying the position of the recess portion 20 (the innermost point of the recess portion 20 in the tire width direction) with respect to each portion in this way makes the structure of the recess portion better, advantageously suppressing accumulation of heat between the belt layer 7 and the carcass layer 4 and ensuring good heat dissipation. When the depth D3 is less than 1.5 mm, there is no difference from the case where the recess portion 20 is not provided, and the effect of suppressing accumulation of heat and improving heat dissipation cannot be sufficiently obtained. When the separation distance D4 is less than 5 mm, the shear strain acting in the tire radial direction at the end position of the cross belt pair may increase, and the durability of the belt layer 7 may decrease.

As shown in the illustrated example, when the lengths of the two belt layers 7 included in the cross belt pair 7' are different, generally, the end portion of the narrower belt layer 7 in the cross belt pair 7' tends to be the starting point of separation. Therefore, it is preferable to dispose the narrower belt layer 7 in the cross belt pair 7' on the outer side in the tire radial direction. That is, since the tread surface side is thermally advantageous, disposing the narrower belt layer 7 that tends to be the starting point of separation as described above is advantageous for improving the belt durability.

As shown in the illustrated example, when the lengths of the two belt layers 7 included in the cross belt pair are different, the separation distance D5 along the tire width direction between the outer end point of the narrower belt layer 7 in the cross belt pair 7' and the outer end point of the wider belt layer 7 in the cross belt pair 7' is preferably 10 mm or more, more preferably 12 mm or more and 17 mm or less. This advantageously suppresses stress concentration at the end portions of the cross belt pair 7'. When the separation distance D5 is less than 10 mm, the end portions of the two belt layers 7 included in the cross belt pair 7' are too close to each other, and it becomes difficult to suppress stress concentration.

An embodiment of the present technology will further be described below by way of Examples, but the scope of an embodiment of the present technology is not limited to Examples.

EXAMPLE

Twenty-six pneumatic tires of Conventional Example 1, Comparative Examples 1 to 6, and Examples 1 to 19 were manufactured which have the tire size of 275/80R22.5 and the basic structure illustrated in FIG. 1, and in which the structure near the end portion of the belt layer was set as shown in Tables 1 to 3.

"D1" in Tables 1 to 3 is the distance between the tire outer surface and the end point on the outer side in the tire radial direction and the outer side in the tire width direction of the cross belt pair measured in parallel to the line segment L1 connecting the ground contact edge P2 and the edge portion P1 of the outermost groove on the outer side in the tire width direction located on the outermost side of the tire width direction of the plurality of circumferential grooves. "G1" in Tables 1 to 3 is the distance between the plurality of belt layers and the carcass layer measured on the normal line of the carcass layer passing through the outer end points in the effective width of the cross belt pair. "Hβ/Hα" in Tables 1 to 3 is the ratio between the radial height H a from the position of the core separation point P3 to the maximum outer diameter position of the carcass layer and the radial height Hβ from the position of the core separation point P3 to the tire maximum width position.

"G3/G2" in Tables 1 to 3 is the ratio between the distance G2 between the outer surface and the inner surface of the tread portion measured on the tire equator and the distance G3 between the outer surface and the inner surface of the tread portion measured on the normal line of the carcass layer passing through the ground contact edge P2. "BW/TW" in Tables 1 to 3 is the ratio between the width BW of the narrower belt layer in the cross belt pair and the ground contact width TW of the tread portion.

"Presence of recess portion" in Tables 1 to 3 indicates whether the recess portion is formed as shown in the illustrated example by the curved shape of the contour line formed on the tire outer surface, "Yes" indicates a case where the recess portion is formed, and "No" indicates a case where the recess portion is not formed. "D2" in Tables 1 to 3 is the length of the recess portion along the tire radial direction. "D3" in Tables 1 to 3 is the depth of the recess portion with respect to the line L2 passing through the point P4 and parallel to the tire radial direction. "D4" in Tables 1 to 3 is the distance along the tire width direction between the outer end point of the wider belt layer in the cross belt pair and the recess portion.

"Position of narrow belt" in Tables 1 to 3 indicates the disposition of the narrower belt layer of the belt layers included in the cross belt pair, "Outside" indicates a case where it is disposed on the outer side in the tire radial direction, and "Inside" indicates a case where it is disposed on the inner side in the tire radial direction. "D5" in Tables 1 to 3 indicates the distance along the tire width direction between the outer end point of the narrower belt layer in the cross belt pair and the outer end point of the wider belt layer in the cross belt pair.

These pneumatic tires are evaluated for belt durability using evaluation methods described below. The results are also indicated in Tables 1 to 3.

Belt Durability

Each test tire was assembled on a rim specified by ETRTO, inflated to 75% of the specified air pressure, and subjected to a load 1.4 times as heavy as the specified load, an indoor drum running test was conducted under the condition of a speed of 49 km/h, and the running distance until a tire failure (tread separation) occurred was measured. Evaluation results are expressed as index values, with the results of Conventional Example 1 being assigned as an index value of 100. Larger index values indicate longer traveling distance until failure occurs, and better belt durability. When the index value is "135" or less, it means that the effect of improving the belt durability is insufficient.

TABLE 1

|  |  | Conventional Example 1 | Comparative Example 1 | Comparative Example 2 | Comparative Example 3 |
|---|---|---|---|---|---|
| D1 | mm | 31.4 | 14.0 | 22.7 | 22.7 |
| G1 | mm | 1.0 | 2.6 | 10.0 | 2.6 |
| Hβ/Hα |  | 0.54 | 0.63 | 0.59 | 0.70 |
| G3/G2 |  | 1.33 | 1.35 | 2.01 | 1.35 |
| BW/TW |  | 0.78 | 1.13 | 0.99 | 1.16 |
| Presence of recess portion |  | No | Yes | Yes | Yes |
| D2 | mm | — | 25 | 25 | 25 |
| D3 | mm | — | 3.5 | 3.5 | 3.5 |
| D4 | mm | — | 10 | 10 | 10 |
| Position of narrow belt |  | Outside | Outside | Outside | Outside |
| D5 | mm | 13 | 13 | 13 | 13 |
| Belt durability | Index value | 100 | 123 | 135 | 129 |

|  |  | Example 1 | Example 2 | Example 3 | Example 4 | Example 5 | Example 6 |
|---|---|---|---|---|---|---|---|
| D1 | mm | 22.7 | 22.9 | 22.7 | 22.8 | 17.0 | 20.0 |
| G1 | mm | 6.8 | 4.1 | 2.8 | 7.5 | 3.5 | 3.5 |
| Hβ/Hα |  | 0.59 | 0.59 | 0.63 | 0.59 | 0.59 | 0.59 |
| G3/G2 |  | 1.35 | 1.26 | 1.17 | 1.39 | 1.35 | 1.33 |
| BW/TW |  | 0.99 | 0.99 | 0.99 | 0.99 | 1.03 | 0.91 |

TABLE 1-continued

|  |  |  |  |  |  |  |  |
|---|---|---|---|---|---|---|---|
| Presence of recess portion |  | Yes | Yes | Yes | Yes | Yes | Yes |
| D2 | mm | 25 | 25 | 25 | 25 | 25 | 25 |
| D3 | mm | 3.5 | 3.5 | 3.5 | 3.5 | 3.5 | 3.5 |
| D4 | mm | 10 | 10 | 10 | 10 | 10 | 10 |
| Position of narrow belt |  | Outside | Outside | Outside | Outside | Outside | Outside |
| D5 | mm | 13 | 13 | 13 | 13 | 13 | 13 |
| Belt durability | Index value | 164 | 162 | 162 | 159 | 176 | 161 |

TABLE 2-1

|  |  | Example 7 | Example 8 | Example 9 | Example 10 | Example 11 |
|---|---|---|---|---|---|---|
| D1 | mm | 23.9 | 23.9 | 24.0 | 23.9 | 24.0 |
| G | mm | 4.8 | 2.9 | 4.3 | 3.7 | 3.2 |
| Hp/Ha |  | 0.57 | 0.61 | 0.58 | 0.58 | 0.57 |
| G3/G2 |  | 1.33 | 1.25 | 1.33 | 1.33 | 1.34 |
| BW/TW |  | 0.91 | 0.91 | 0.91 | 0.91 | 0.91 |
| Presence of recess portion |  | Yes | Yes | Yes | Yes | Yes |
| D2 | mm | 25 | 25 | 25 | 25 | 25 |
| D3 | mm | 3.5 | 3.5 | 3.5 | 3.5 | 3.5 |
| D4 | mm | 10 | 10 | 10 | 10 | 10 |
| Position of narrow belt |  | Outside | Outside | Outside | Outside | Outside |
| D5 | mm | 13 | 13 | 13 | 13 | 13 |
| Belt durability | Index value | 158 | 157 | 156 | 153 | 152 |

|  |  | Comparative Example 4 | Comparative Example 5 | Comparative Example 6 | Example 12 |
|---|---|---|---|---|---|
| D1 | mm | 22.7 | 22.8 | 23.9 | 25.0 |
| G | mm | 9.1 | 2.2 | 9.1 | 3.3 |
| Hp/Ha |  | 0.56 | 0.62 | 0.54 | 0.59 |
| G3/G2 |  | 1.79 | 1.58 | 1.87 | 1.37 |
| BW/TW |  | 0.99 | 0.99 | 0.91 | 0.83 |
| Presence of recess portion |  | Yes | Yes | Yes | Yes |
| D2 | mm | 25 | 25 | 25 | 25 |
| D3 | mm | 3.5 | 3.5 | 3.5 | 3.5 |
| D4 | mm | 10 | 10 | 10 | 10 |
| Position of narrow belt |  | Outside | Outside | Outside | Outside |
| D5 | mm | 13 | 13 | 13 | 13 |
| Belt durability | Index value | 130 | 122 | 131 | 154 |

TABLE 3

|  |  | Example 13 | Example 14 | Example 15 | Example 16 | Example 17 | Example 18 | Example 19 |
|---|---|---|---|---|---|---|---|---|
| D1 | mm | 24.0 | 24.0 | 24.0 | 24.0 | 24.0 | 24.0 | 24.0 |
| G1 | mm | 3.2 | 3.2 | 3.2 | 3.2 | 3.2 | 3.2 | 3.2 |
| Hβ/Hα |  | 0.57 | 0.57 | 0.57 | 0.57 | 0.57 | 0.57 | 0.57 |
| G3/G2 |  | 1.34 | 1.34 | 1.34 | 1.34 | 1.34 | 1.34 | 1.34 |
| BW/TW |  | 0.91 | 0.91 | 0.91 | 0.91 | 0.91 | 0.91 | 0.91 |
| Presence of recess portion |  | No | Yes | Yes | Yes | Yes | Yes | Yes |
| D2 | mm | — | 10 | 60 | 25 | 60 | 25 | 25 |
| D3 | mm | — | 3.5 | 3.5 | 1.0 | 3.5 | 3.5 | 3.5 |
| D4 | mm | — | 10 | 10 | 10 | 2 | 10 | 10 |
| Width of narrow belt |  | Outside | Outside | Outside | Outside | Outside | Inside | Outside |
| D5 | mm | 13 | 13 | 13 | 13 | 13 | 13 | 9 |
| Belt durability | Index value | 148 | 150 | 157 | 149 | 157 | 146 | 137 |

As can be seen from Tables 1 to 3, any of Examples 1 to 19 has greatly improved belt durability compared to Conventional Example 1. On the other hand, in Comparative Examples 1 to 6, since any of the distance D1, the distance G1, and the ratio Hβ/Hα is not appropriate, the tire structure in the buttress portion cannot be improved, and the effect of improving the belt durability was not sufficiently obtained.

The invention claimed is:

1. A pneumatic tire, comprising:
    a tread portion extending in a tire circumferential direction and having an annular shape;
    a pair of sidewall portions respectively disposed on both sides of the tread portion;
    a pair of bead portions each disposed on an inner side of the pair of sidewall portions in a tire radial direction;
    at least one carcass layer mounted between the pair of bead portions and folded back from a tire inner side toward an outer side around a bead core each provided in the bead portions;
    a plurality of belt layers disposed on an outer circumferential side of the carcass layer in the tread portion; and
    a plurality of circumferential grooves extending along the tire circumferential direction on an outer surface of the tread portion;
    the plurality of belt layers comprising a cross belt pair made of two belt layers configured to reverse inclination directions of reinforcing cords constituting each of the belt layers to cause the reinforcing cords to intersect with each other,
    a distance D1 between a tire outer surface and an end point of the cross belt pair on the outer side in the tire radial direction and the outer side in a tire width direction measured in parallel to a line segment L1 connecting a ground contact edge P2 and an edge portion P1 of an outermost groove on the outer side in the tire width direction located on an outermost side in the tire width direction of the plurality of circumferential grooves satisfying a relationship of 15 mm≤D1≤25 mm,
    a distance G1 between the plurality of belt layers and the carcass layer measured on a normal line of the carcass layer passing through an outer end point in an effective width of the cross belt pair satisfying a relationship of 2.5 mm≤ G1≤9.0 mm, and
    a radial height Hα from a position of a core separation point P3 defined as an intersection point of the carcass layer with an extension line of a side on the outer side of the bead core in the tire radial direction to a maximum outer diameter position of the carcass layer and a radial height HB from the position of the core separation point P3 to a tire maximum width position satisfying a relationship of 0.55≤HB/Hα≤0.65.

2. The pneumatic tire according to claim 1, wherein
    a ratio G3/G2 between a distance G2 between an outer surface and an inner surface of the tread portion measured on a tire equator and a distance G3 between the outer surface and the inner surface of the tread portion measured on the normal line of the carcass layer passing through the ground contact edge P2 satisfies a relationship of 1.1≤ G3/G2≤1.4.

3. The pneumatic tire according to claim 1, wherein
    a ratio BW/TW between a width BW of a narrower belt layer in the cross belt pair and a ground contact width TW of the tread portion satisfies a relationship of 0.90≤BW/TW≤1.10.

4. The pneumatic tire according to claim 1, wherein
    a contour line formed by a tire outer surface on the outer side in the tire width direction from the ground contact edge P2 has a curve R1 that includes the ground contact edge P2 and is curved projecting toward the outer side in the tire width direction and a curve R2 connected to the curve R1 and curved projecting toward the inner side in the tire width direction,
    at least a part of the curve R2 is located on the inner side in the tire width direction from a line L2, which passes through a point P4 located on the outermost side in the tire width direction on the curve R1 and is parallel to the tire radial direction, and forms a recess portion, and the recess portion is disposed in a region A1 defined between the tire maximum width position and an intersection point P5 of the curve R1 with a straight line that passes through a position 0.85 times a groove depth of the outermost groove from a tread surface and is parallel to the line segment L1.

5. The pneumatic tire according to claim 4, wherein
    a length D2 of the recess portion along the tire radial direction is from 15 mm to 55 mm.

6. The pneumatic tire according to claim 4, wherein
    a depth D3 of the recess portion with respect to the line L2 that passes through the point P4 and is parallel to the tire radial direction is 1.5 mm or more.

7. The pneumatic tire according to claim 4, wherein
    a separation distance D4 along the tire width direction between an outer end point of a wider belt layer in the cross belt pair and the recess portion is 5 mm or more.

8. The pneumatic tire according to claim 1, wherein
    a narrower belt layer in the cross belt pair is disposed on the outer side in the tire radial direction.

9. The pneumatic tire according to claim 1, wherein
    a separation distance D5 along the tire width direction between an outer end point of a narrower belt layer in the cross belt pair and the outer end point of a wider belt layer in the cross belt pair is 10 mm or more.

10. The pneumatic tire according to claim 1, wherein
    the plurality of belt layers includes, in addition to the cross belt pair, a large-angle belt layer in which an inclination angle of the reinforcing cords with respect to the tire circumferential direction is larger than that of the cross belt pair.

11. The pneumatic tire according to claim 2, wherein
    a ratio BW/TW between a width BW of a narrower belt layer in the cross belt pair and a ground contact width TW of the tread portion satisfies a relationship of 0.90≤BW/TW≤1.10.

12. The pneumatic tire according to claim 11, wherein
    a contour line formed by a tire outer surface on the outer side in the tire width direction from the ground contact edge P2 has a curve R1 that includes the ground contact edge P2 and is curved projecting toward the outer side in the tire width direction and a curve R2 connected to the curve R1 and curved projecting toward the inner side in the tire width direction,
    at least a part of the curve R2 is located on the inner side in the tire width direction from a line L2, which passes through a point P4 located on the outermost side in the tire width direction on the curve R1 and is parallel to the tire radial direction, and forms a recess portion, and the recess portion is disposed in a region A1 defined between the tire maximum width position and an intersection point P5 of the curve R1 with a straight line that passes through a position 0.85 times a groove depth of the outermost groove from a tread surface and is parallel to the line segment L1.

13. The pneumatic tire according to claim 12, wherein a length D2 of the recess portion along the tire radial direction is from 15 mm to 55 mm.

14. The pneumatic tire according to claim 13, wherein a depth D3 of the recess portion with respect to the line L2 that passes through the point P4 and is parallel to the tire radial direction is 1.5 mm or more.

15. The pneumatic tire according to claim 14, wherein a separation distance D4 along the tire width direction between an outer end point of a wider belt layer in the cross belt pair and the recess portion is 5 mm or more.

16. The pneumatic tire according to claim 15, wherein the narrower belt layer in the cross belt pair is disposed on the outer side in the tire radial direction.

17. The pneumatic tire according to claim 16, wherein a separation distance D5 along the tire width direction between an outer end point of the narrower belt layer in the cross belt pair and the outer end point of the wider belt layer in the cross belt pair is 10 mm or more.

18. The pneumatic tire according to claim 17, wherein the plurality of belt layers includes, in addition to the cross belt pair, a large-angle belt layer in which an inclination angle of the reinforcing cords with respect to the tire circumferential direction is larger than that of the cross belt pair.

* * * * *